(12) United States Patent
Kunduru et al.

(10) Patent No.: US 12,587,446 B2
(45) Date of Patent: Mar. 24, 2026

(54) MANAGING NETWORK DEVICE CONFIGURATIONS BASED ON CONFIGURATION FRAGMENTS

(71) Applicant: Arista Networks, Inc., Santa Clara, CA (US)

(72) Inventors: Charanjith Kunduru, Cupertino, CA (US); Christopher Elisha Neilson, Coquitlam (CA); Sebastian Sapa, Vancouver (CA); Roman Chertov, San Jose, CA (US); Itthichok Jangjaimon, San Jose, CA (US); Diego Alfredo Asturias, Mountain View, CA (US)

(73) Assignee: ARISTA NETWORKS, INC., Santa Clara, CA (US)

( * ) Notice: Subject to any disclaimer, the term of this patent is extended or adjusted under 35 U.S.C. 154(b) by 0 days.

(21) Appl. No.: 18/620,589

(22) Filed: Mar. 28, 2024

(65) Prior Publication Data

US 2025/0310198 A1     Oct. 2, 2025

(51) Int. Cl.
*H04L 41/084* (2022.01)
*H04L 41/0873* (2022.01)

(52) U.S. Cl.
CPC ...... *H04L 41/0846* (2013.01); *H04L 41/0873* (2013.01)

(58) Field of Classification Search
CPC .................. H04L 41/0846; H04L 41/0873
USPC ........................................................ 709/22
See application file for complete search history.

(56) References Cited

U.S. PATENT DOCUMENTS

| | | | |
|---|---|---|---|
| 10,719,308 B1 * | 7/2020 | Putre ................... | G06F 11/3476 |
| 2014/0379881 A1 | 12/2014 | Bradley et al. | |
| 2015/0271016 A1 * | 9/2015 | Seligson ............. | H04L 41/0813 |
| | | | 709/220 |
| 2017/0116235 A1 * | 4/2017 | Yam ...................... | G06F 16/258 |
| 2018/0019917 A1 * | 1/2018 | Agarwal ............. | H04L 41/0869 |
| 2019/0190776 A1 * | 6/2019 | Bregman ........... | G06F 9/45558 |
| 2019/0289082 A1 * | 9/2019 | Furuichi ................ | H04L 12/66 |
| 2020/0174993 A1 * | 6/2020 | Wood .................. | H04L 41/0846 |
| 2020/0195501 A1 * | 6/2020 | Shenoy .............. | H04L 41/0863 |
| 2021/0367857 A1 * | 11/2021 | Ovadia ................ | H04L 43/045 |

FOREIGN PATENT DOCUMENTS

EP            4152724 A1     3/2023

OTHER PUBLICATIONS

European Patent Office, Extended European Search Report, EP Application No. 25166552.7, dated Jul. 22, 2025, 12 pgs.

* cited by examiner

*Primary Examiner* — Meng Vang
(74) *Attorney, Agent, or Firm* — Fountainhead Law Group, PC

(57)            ABSTRACT

Some embodiments provide a method for configuring a network device based on configuration fragments. A set of commands for configuring a configuration fragment of a network device is received. The configuration fragment defines a portion of a configuration of the network device. It is determined whether the set of commands are allowed to be applied to the configuration fragment of the network device. Upon determining that the set of commands are allowed to be applied to the configuration fragment of the network device, the portion of the configuration of the network device is configured based on the set of commands.

15 Claims, 11 Drawing Sheets

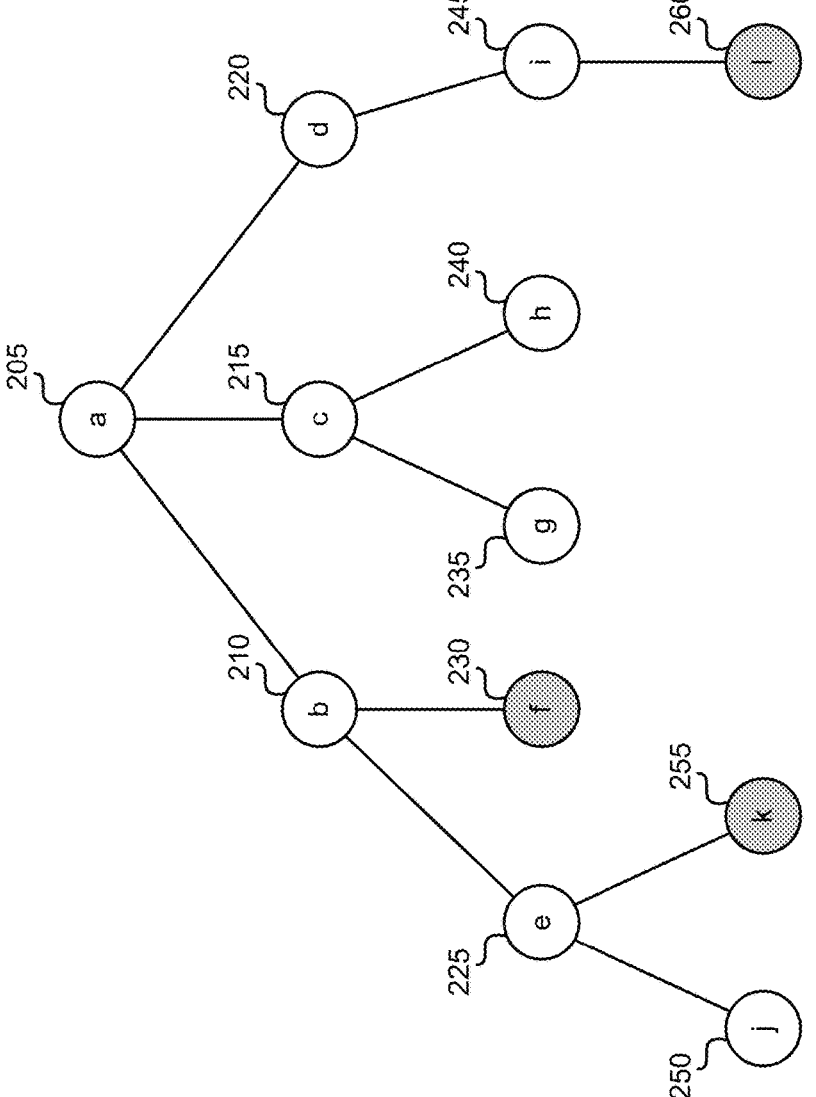
FIG. 3B

| Path | Priority | Configuration Fragment |
|---|---|---|
| a/b/e/j | 100 | Fragment X |
| a/b/e/k | 110 | Fragment Y |
| a/b/f | 110 | Fragment Y |
| a/c/g | 100 | Fragment X |
| a/c/h | 100 | Fragment X |
| a/d/i/l | 110 | Fragment Y |

405 ∽
410 ∽
415 ∽
420 ∽
425 ∽
430 ∽

Configuration Fragment X
    j = 15
    g = hello
    h = true

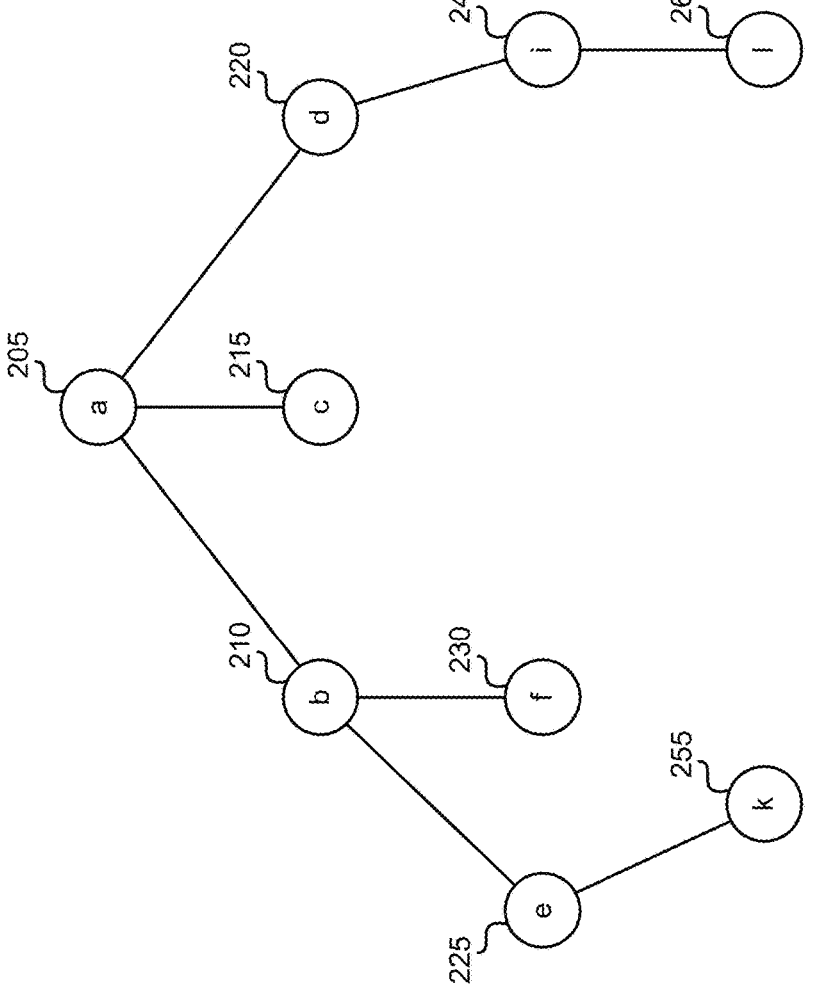
FIG. 6A

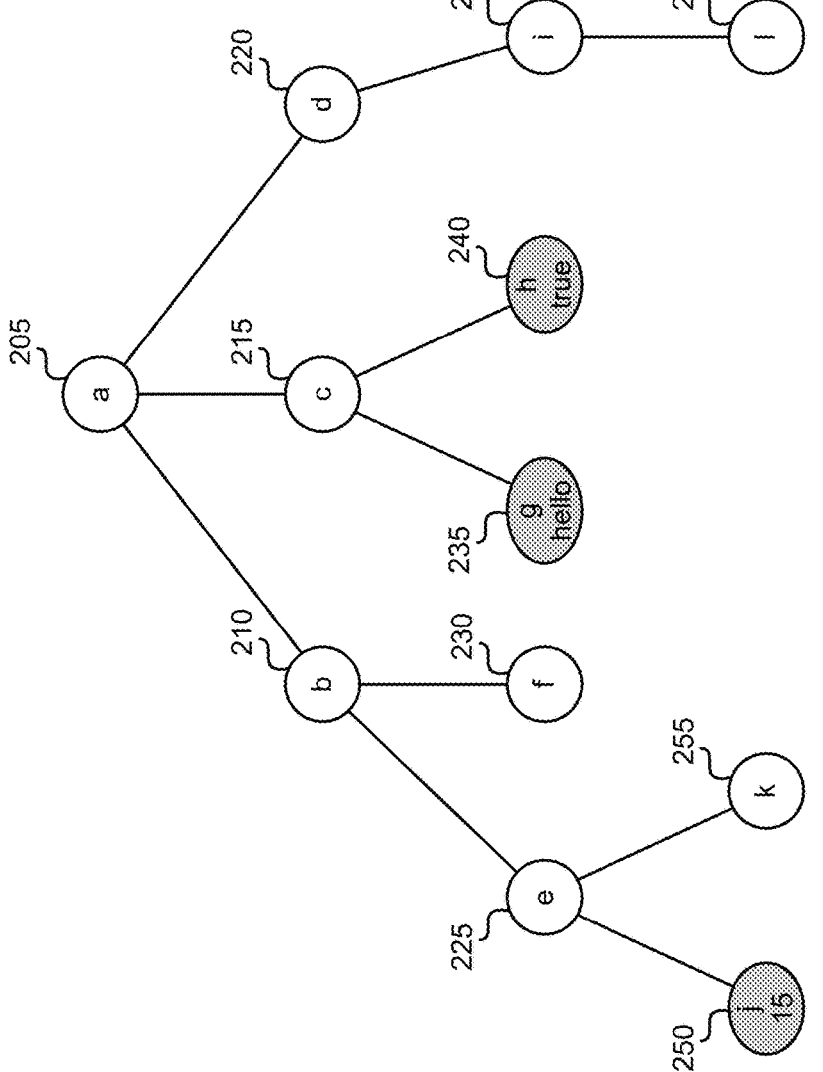
FIG. 6B

700

Configuration Fragment Y
    k = EST
    f = 10.1.0.4
    g = goodbye
    l = enable

400

| Path | Priority | Configuration Fragment |
|---|---|---|
| a/b/e/j | 100 | Fragment X |
| a/b/e/k | 110 | Fragment Y |
| a/b/f | 110 | Fragment Y |
| a/c/g | 110 | Fragment Y |
| a/c/h | 100 | Fragment X |
| a/d/i/l | 110 | Fragment Y |

900

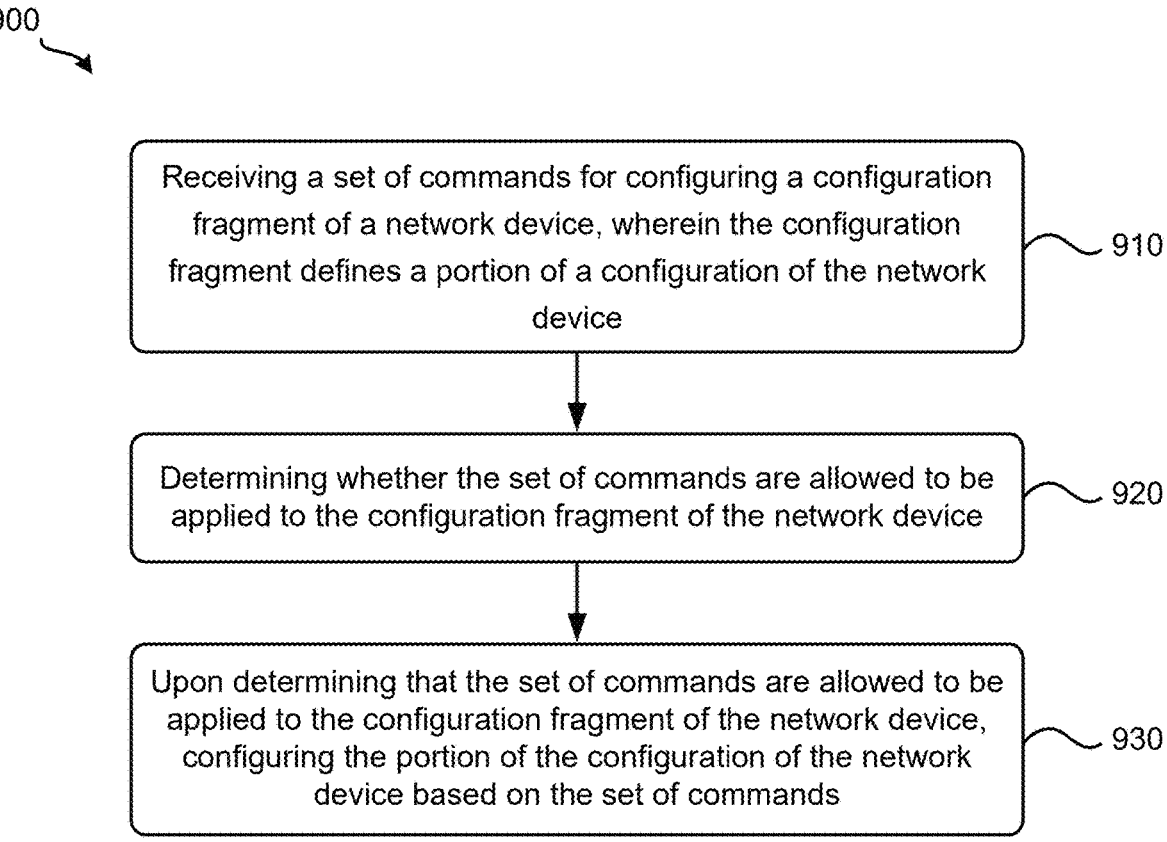

Receiving a set of commands for configuring a configuration fragment of a network device, wherein the configuration fragment defines a portion of a configuration of the network device ⌒ 910

Determining whether the set of commands are allowed to be applied to the configuration fragment of the network device ⌒ 920

Upon determining that the set of commands are allowed to be applied to the configuration fragment of the network device, configuring the portion of the configuration of the network device based on the set of commands ⌒ 930

FIG. 9

MANAGING NETWORK DEVICE CONFIGURATIONS BASED ON CONFIGURATION FRAGMENTS

BACKGROUND

A network device configuration is the settings and parameters applied to the network device so that the network device can function properly in a network. Network device configurations control the behavior of the network device (e.g., how the network device operates, how the network device communicates with other devices on the network, how the network device handles traffic, etc.). Examples of network device configuration settings include an Internet Protocol (IP) address, a subnet mask, a default gateway, routing protocols, access control lists (ACLs), Virtual Local Area Networks (VLANs), Quality of Service (QOS) settings, security settings (e.g., encryption, authentication, and intrusion detection/prevention, etc.), etc. Network device configurations may be set through a number of different ways. For example, some network devices can be configured through a command-line interface (CLI) or a graphical user interface (GUI) provided by the network device.

The following detailed description and accompanying drawings provide a better understanding of the nature and advantages of various embodiments of the present disclosure.

BRIEF DESCRIPTION OF THE DRAWINGS

FIGS. 3A and 3B illustrate configuration fragments of the configuration tree illustrated in FIG. 2 according to some embodiments.

FIGS. 6A and 6B illustrate modifications to a copy of the configuration tree illustrated in FIG. 2 according to some embodiments.

FIG. 9 illustrates a process for managing network device configurations based on configuration fragments according to some embodiments.

DETAILED DESCRIPTION

In the following description, for purposes of explanation, numerous examples and specific details are set forth in order to provide a thorough understanding of the present disclosure. It will be evident, however, to one skilled in the art that various embodiment of the present disclosure as defined by the claims may include some or all of the features in these examples alone or in combination with other features described below, and may further include modifications and equivalents of the features and concepts described herein.

Described herein are techniques for managing network device configurations based on configuration fragments. In some embodiments, a configuration fragment may specify configuration settings for a portion of a configuration of a network device. A user can use a configuration fragment to configure one part of the configuration of the network device while leaving other parts alone. Thus, different users can use different configuration fragments to configure different parts of the configuration of the same network device.

The techniques described in the present application provide a number of benefits and advantages over conventional methods for managing network device configurations. For instance, the techniques described herein perform direct tree node comparisons to determine any potential configuration conflicts. As a result, the application of configurations can be performed faster than conventional methods.

Figure 1:
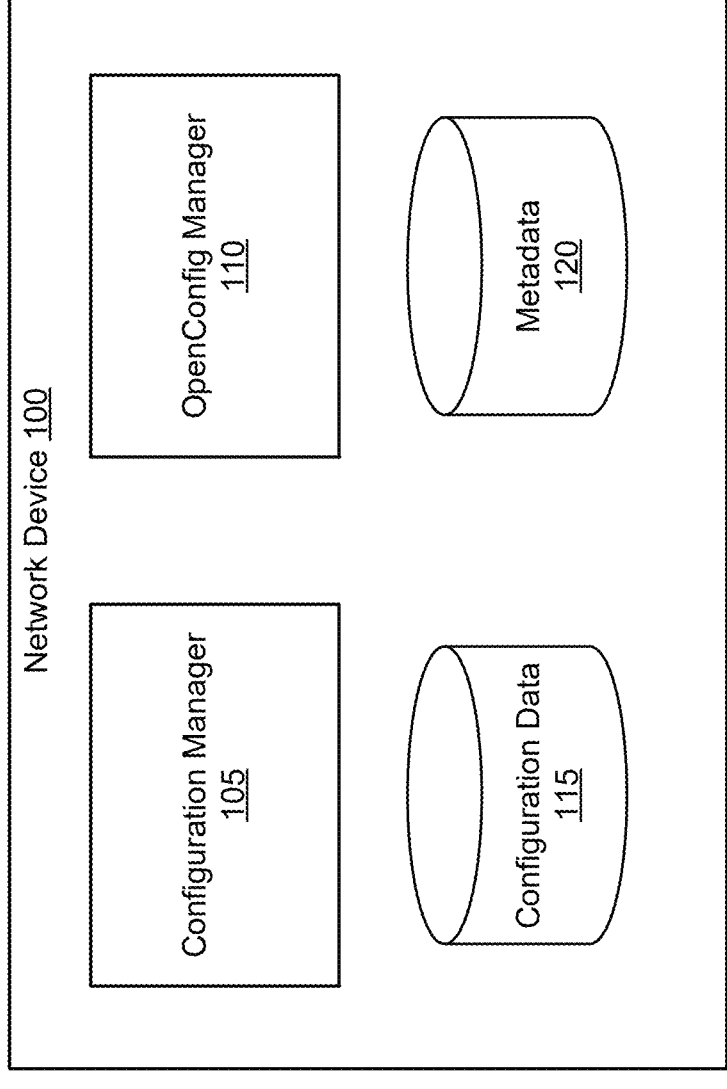
FIG. 1 illustrates a network device for managing network device configurations based on configuration fragments according to some embodiments.

FIG. 1 illustrates a network device 100 for managing network device configurations based on configuration fragments according to some embodiments. As shown, network device 100 includes configuration manager 105, OpenConfig manager 110, configuration data storage 115, and metadata storage 120. Configuration data storage 115 is configured to store configuration data for network device 100. In some embodiments, the configuration data includes settings and parameters for controlling how network device 100 operates. The configuration data may also include definitions of configuration fragment (e.g., definitions of portions of the configuration of network device 100). Metadata storage 120 stores metadata describing the configuration data of network device 100.

Configuration manager 105 is responsible for managing the configuration of network device 100. For example, configuration manager 105 may receive a set of commands for modifying the configuration of network device 100. In response to receiving the set of commands, configuration manager 105 can translate the set of commands into a set of instructions for modifying the configuration of network device 100. Based on the set of instructions, configuration manager 105 modifies the configuration of network device 100 by modifying the configuration data stored in configuration data storage 115. In some instances, configuration manager 105 can receive the set of commands from a user through a command line interface (CLI) provided by configuration manager 105. In other case, configuration manager 105 may receive the set of commands from OpenConfig manager 110. In instances where configuration manager 105 receives the set of commands from OpenConfig manager 110, configuration manager 105 can send OpenConfig manager 110 a message indicating the success of each of the commands (e.g., all the commands were successful, all the commands were not successful, or some commands were successful and some commands were not successful).

OpenConfig manager 110 handles OpenConfig commands for configuring network device 100. In some embodiments, OpenConfig defines and implements a common, vendor-independent software layer for managing network devices. OpenConfig may use vendor-neutral data models to configure and manage network devices. The data models define the configuration and operational state of network devices for common network protocols or services. When OpenConfig manager 110 receives a set of OpenConfig commands (e.g., from a user, a network controller, etc.) for configuring network device 100, OpenConfig manager 110 may forward them to configuration manager 105 for processing. In response to sending the set of OpenConfig commands to configuration manager 105, OpenConfig manager 110 can receive from configuration manager 105 a message indicating the success of the commands, which OpenConfig manager 110 forwards to the source from which OpenConfig manager 110 received the set of OpenConfig commands.

Figure 2:
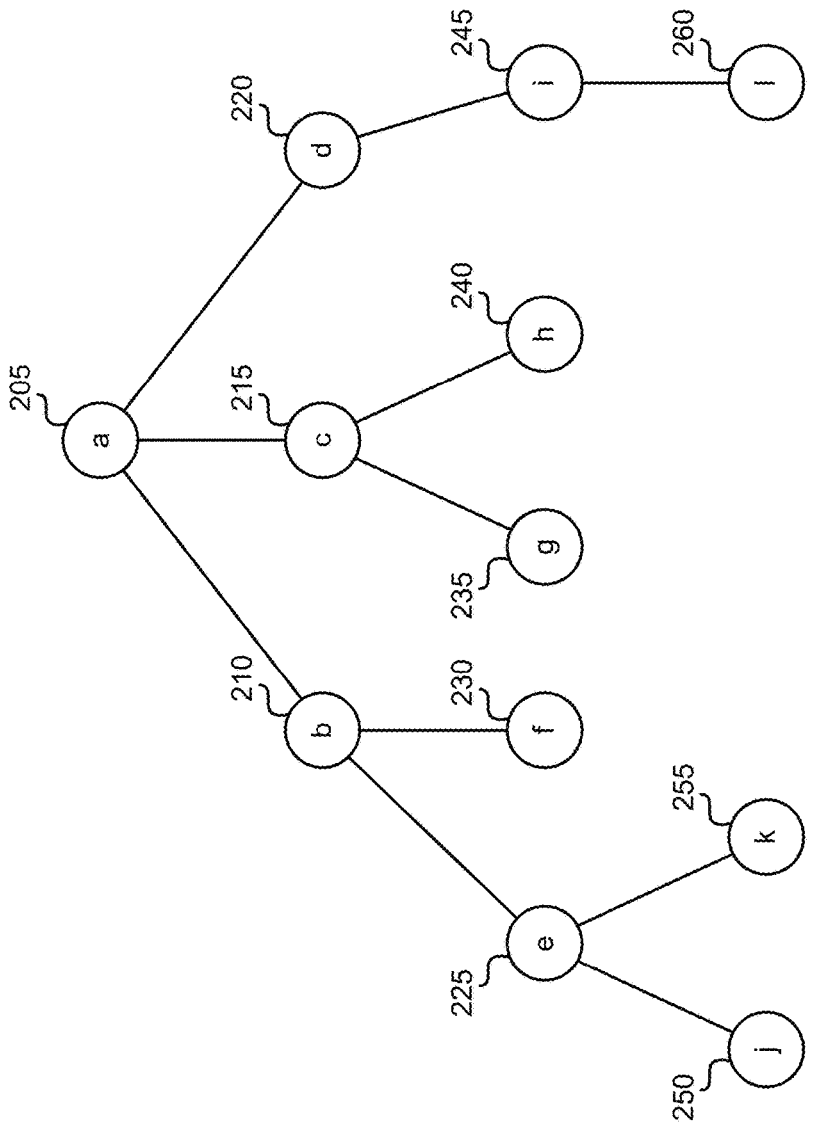
FIG. 2 illustrates an example configuration tree according to some embodiments.

In some embodiments, the configuration data stored in configuration data storage 115 is stored using a trie-based data structure. For instance, a configuration of network device 100 may be represented using a configuration tree. In some embodiments, a configuration tree can have one or more leaf nodes (e.g., a node that does not have any child nodes). Each leaf node may represent a configuration object. A configuration object may be expressed in terms of a path expression and an attribute value. FIG. 2 illustrates an example configuration tree 200 according to some embodiments. Specifically, FIG. 2 shows an example of a configuration tree that can be used to store the configuration of network device 100. As depicted, configuration tree 200 includes nodes 205-260 that are connected to each other to form a tree data structure. Here, node 205 is the root node and nodes 210-220 are child nodes of node 205. Nodes 225 and 230 are child nodes of node 210. Nodes 250 and 255 are child nodes of node 225. Nodes 235 and 240 are child nodes of node 215. Node 245 is a child node 220. Node 260 is a child node of node 245. Nodes 250, 255, 230, 235, 240, and 260 are referred to as leaf nodes as they each do not have any child nodes. As mentioned above, a leaf node may represent a configuration object that is expressed in terms of a path expression and an attribute value. The path expression can be formed using the node names. For example, the path expression of leaf node 250 is "a/b/e/j". Similarly, the path expression of leaf node 255 is "a/b/e/k", the path expression of leaf node 230 is "a/b/f", the path expression of leaf node of node 235 is "a/c/g", the path expression of leaf node 240 is "a/c/h", and the path expression of leaf node 260 is "a/d/i/l". For this example, attribute values of the configuration objects are not shown.

Figure 3A:
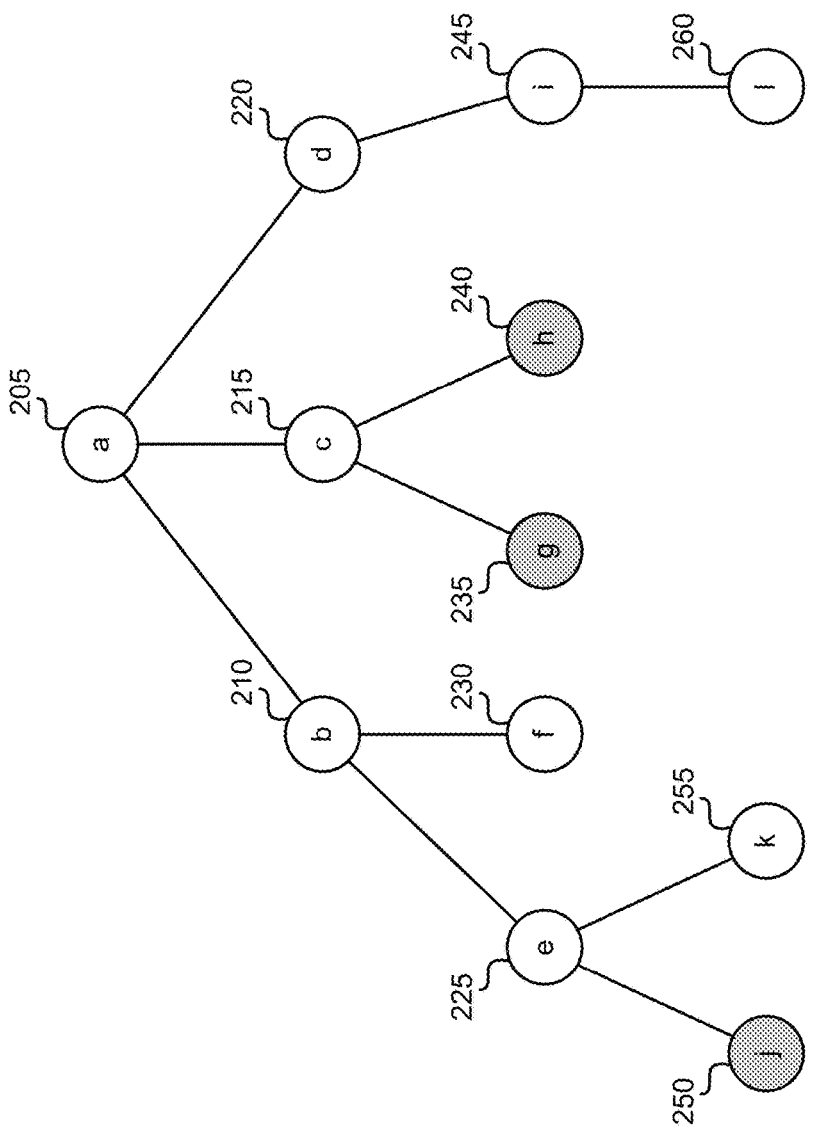

FIGS. 3A and 3B illustrate configuration fragments of configuration tree 200 according to some embodiments. In particular, FIG. 3A illustrates a configuration fragment that defines a portion of configuration tree 200. In this example, the configuration fragment includes leaf nodes 250, 235, and 240, as indicated by the gray highlighting of the nodes. That is, the configuration objects represented by leaf nodes 250, 235, and 240 form the configuration fragment illustrated in FIG. 3A. FIG. 3B illustrates a configuration fragment that defines another portion of configuration tree 200. Here, the configuration fragment includes leaf nodes 255, 230, and 260, as depicted by the gray highlighting of the nodes. As such, the configuration objects represented by leaf nodes 255, 230, and 260 form the configuration fragment shown in FIG. 3B. As illustrated in FIGS. 3A and 3B, the configuration fragment in FIG. 3A and the configuration fragment in FIG. 3B do not share any portion of the configuration of network device 100.

The example configuration fragments in FIGS. 3A and 3B depicts how configuration fragments can be defined on a configuration object-by-configuration object basis. In some embodiments, a configuration object can have several attributes. For instance, the configuration object represented by path "a/b/e/k" (i.e., leaf node 255) can have three attributes k.1, k.2, and k.3. In some such embodiments, configuration fragments may be defined on an attribute basis. For example, the configuration fragment shown in FIG. 3A can be defined to include attribute k.2 of the configuration object and the configuration fragment shown in FIG. 3B can be defined to include attributes k.1 and k.3.

Figure 4:
FIG. 4 illustrates an example metadata describing the configuration fragments illustrated in FIGS. 3A and 3B according to some embodiments.

In some embodiments, metadata may be used to describe each configuration object (i.e., leaf node) in a configuration tree. For instance, the metadata can specify a fragment identifier (ID) to which the configuration object belongs, a priority value of the configuration object, etc. FIG. 4 illustrates an example metadata 400 describing the configuration fragments illustrated in FIGS. 3A and 3B according to some embodiments. For this example, metadata 400 is stored in configuration data storage 115 along with configuration tree 200. As illustrated, metadata 400 is represented as a table with a Path column, a Priority column, and a Configuration Fragment column. The Path column is configured to store a path expression of a configuration object. The Priority column is configured to store a priority associated with the configuration object. The Configuration Fragment is configured to store a fragment ID that uniquely identifies a configuration fragment with which the configuration object is associated.

As shown in FIG. 4, the table representing metadata 400 includes rows 405-430. Each row 405-430 specifies a configuration object that belongs to a particular configuration fragment along with a priority value of the configuration object. Here, rows 405, 420, and 425 specify configuration objects that correspond to nodes 250, 235, and 240 in FIG. 3A as belonging to configuration fragment X. The configuration objects in configuration fragment X have a priority value of 100. Rows 410, 415, and 430 specify configuration objects that correspond to nodes 250, 235, and 240 in FIG. 3B as belonging to configuration fragment Y. The configuration objects in configuration fragment Y have a priority value of 110.

When a configuration fragment is defined, the metadata associated with the configuration fragment is stored in metadata storage 120, which is persisted whenever network device 100 shuts down. In some embodiments, when network device 100 shuts down, the configuration data stored in configuration data storage 115 is not persisted. When network device 100 is started up (e.g., is rebooted), configuration manager 105 can load the configuration of network device 100 into configuration data storage 115, read the metadata stored in metadata storage 120, and repopulate the metadata into configuration data storage 115. This way, the configuration fragments defined for network device 100 are persisted when network device 100 is rebooted or shut down and started up.

Figure 5:
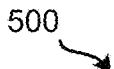
FIG. 5 illustrates configuring a configuration fragment of a network device according to some embodiments.

An example of modifying the configuration of network device 100 using a configuration fragment will now be described by reference to FIGS. 1-6. FIG. 5 illustrates configuring a configuration fragment of a network device according to some embodiments. Specifically, FIG. 5 shows a set of commands 500 for configuring configuration fragment X. In this example, network device 100 receives the set of commands 500 from a user through a CLI provided by configuration manager 105. The set of commands 500 specifies configuration fragment X as the configuration fragment to configure and attribute values for three configuration objects j, g, and h. In response to receiving the set of commands 500, configuration manager 105 translates the set of commands 500 into a set of instructions for modifying the configuration of network device 100. In this example, the set of instructions include an instruction to set the attribute value of the configuration object a/b/e/j (i.e., node 250) to 15, an instruction to set the attribute value of the configuration object a/c/g (i.e., node 235) to "hello," and an instruction to set the attribute value of the configuration object a/c/h (i.e., node 240) to "true."

After translating the set of commands 500 into the set of instructions, configuration manager 105 determines whether the set of instructions can be applied to the configuration fragment X of the configuration of network device 100. To do so, configuration manager 105 creates a session for making modifications to the configuration of network device 100. Next, configuration manager 105 accesses configuration data storage 115 to retrieve a copy of configuration tree 200. Configuration manager 105 then deletes the configuration objects belonging to the configuration fragment specified in the set of commands 500 (configuration fragment X in this example). For this example, configuration manager 105 deletes configuration object a/b/e/j (i.e., node 250), configuration object a/c/g (i.e., node 235), and configuration object a/c/h (i.e., node 240) from the copy of configuration tree 200.

FIGS. 6A and 6B illustrate modifications to a copy of configuration tree 200 (referred to as configuration tree 600) according to some embodiments. In particular, FIG. 6A illustrates a copy of configuration tree 200 after configuration manager 105 deletes the configuration objects belonging to configuration fragment X from the copy of configuration tree 200. As depicted, configuration tree 600 does not have nodes 250, 235, and 240, which correspond to configuration objects a/b/e/j, a/c/g, and a/c/h, respectively.

Once configuration manager 105 finishes generating a copy of configuration tree 200 and removing the appropriate configuration objects from it, configuration manager 105 then executes the set of instructions on the copy of configuration tree 200. In this example, configuration manager 105 executes the set of instructions on the copy of configuration tree 200 by adding the configuration objects a/b/e/j, a/c/g, and a/c/h to the copy of configuration tree 200 and setting their attribute values using the ones specified in the set of commands 500. For each configuration object that is added to the copy of configuration tree 200, configuration manager 105 determines whether the priority of the configuration fragment specified in the set of commands 500 conflicts with the priority of the configuration object specified in metadata 400. In some embodiments, a conflict exists when the priority of the configuration fragment specified in the set of commands 500 is less than the priority specified for the configuration object in metadata 400. For this example, a priority for configuration fragment X has been predefined as 100. Thus, configuration manager 105 determines that the priority of the configuration fragment specified in the set of commands 500 is 100. Since the priority of the configuration fragment specified in the set of commands 500 is greater than or equal to the priority of each of the configuration objects a/b/e/j, a/c/g, and a/c/h specified in metadata 400, configuration manager 105 determines that no conflict exists for any of the configuration objects. When no conflicts exist, configuration manager 105 commits the set of commands 500 to the configuration of network device 100 (i.e., configuration manager 105 configures the configuration fragment X of the configuration of network device 100) by replacing (e.g., overwriting) configuration tree 200 in configuration data storage 115 with the copy of configuration tree 200. In cases where configuration manager 105 determines a conflict exists, configuration manager 105 rejects the set of command by not making any changes to the configuration of network device 100. For instance, if set of commands 500 included a command f=10.2.0.13, which configuration manager 105 would translate to an instruction to set the attribute value of the configuration object a/b/f (i.e., node 230) to "10.2.0.13," configuration manager 105 would determine that a conflict exists because the priority of the configuration fragment specified in the set of commands 500 (100 in this example) is less than the priority specified for the configuration object in metadata 400 (110 in this example). As such, configuration manager 105 would reject the set of commands 500 by not applying any of the commands in the set of commands 500 to the configuration of network device 100. After committing or rejecting the configuration, configuration manager 105 deletes the copy of configuration tree 200 and the session.

FIG. 6B illustrates a copy of configuration tree 200 after configuration manager 105 executes the set of instructions on the copy of configuration tree 200. As shown in FIG. 6B, configuration tree 600 now includes nodes 250, 235, and 240. In addition, the attribute values specified in the set of commands 500 are used to set the attribute values of configuration objects a/b/e/j, a/c/g, and a/c/h. When configuration manager 105 commits the set of commands 500 to the configuration of network device 100, configuration manager replaces configuration tree 200 (shown in FIG. 2) in configuration data storage 115 with configuration tree 600 in FIG. 6B.

Figure 7:
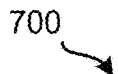
FIG. 7 illustrates configuring another configuration fragment of a network device according to some embodiments.

Another example of modifying the configuration of network device 100 using a configuration fragment will now be described by reference to FIGS. 1-4, 7, and 8. FIG. 7 illustrates configuring another configuration fragment of a network device according to some embodiments. Specifically, FIG. 7 shows a set of commands 700 for configuring configuration fragment Y. For this example, network device 100 receives the set of commands 700 from a user through a CLI provided by configuration manager 105. The set of commands 700 specifies configuration fragment Y as the configuration fragment to configure and attribute values for four configuration objects k, f, g, and l. In response to receiving the set of commands 700, configuration manager 105 translates the set of commands 700 into a set of instructions for modifying the configuration of network device 100. Here, the set of instructions include an instruction to set the attribute value of the configuration object a/b/e/k (i.e., node 255) to "EST," an instruction to set the attribute value of the configuration object a/b/f (i.e., node 230) to 10.1.0.4, an instruction to set the attribute value of the configuration object a/c/g (i.e., node 235) to "goodbye," and an instruction to set the attribute value of the configuration object a/d/i/l (i.e., node 260) to "enable."

Figure 8:
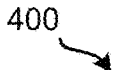
FIG. 8 illustrates the metadata illustrated in FIG. 4 after the configuration fragment illustrated in FIG. 3B is configured using the set of commands illustrated in FIG. 7 is applied according to some embodiments.

Upon translating the set of commands 700 into the set of instructions, configuration manager 105 determines whether the set of instructions can be applied to the configuration fragment Y of the configuration of network device 100. For this example, configuration manager 105 uses the same technique as the one employed in the example described above by reference to FIGS. 1-6 to make this determination (e.g., retrieving a copy of configuration tree 200 from configuration data storage 115, deleting the configuration objects belonging to the configuration fragment specified in the set of commands 700 (configuration fragment Y in this example), executing the set of instructions on the copy of configuration tree 200, determining whether any conflicts exists between the priority of the configuration fragment specified in the set of commands 700 and the priorities of the added configuration objects, etc.). In this example, a priority for configuration fragment Y has been predefined as 110 (as shown in FIG. 8) and, hence, configuration manager 105 determines that the priority of the configuration fragment specified in the set of commands 700 is 110.

Here, configuration manager 105 determines that the set of instructions can be applied to the configuration fragment Y of the configuration of network device 100 because configuration manager 105 determined that no conflict exists between the priority of the configuration fragment Y and the priorities of the added configuration objects. In addition, configuration object a/c/g, which previously belonged to configuration fragment X, now belongs to configuration fragment Y since the priority value of configuration fragment Y is greater than the priority value specified for configuration object a/c/g in metadata 400. As a result, configuration manager 105 updates metadata 400 to indicate that configuration object a/c/g now belongs to configuration fragment Y. On the other hand, if the priority of fragment Y was less than the priority of fragment X, then object a/c/g would not have been added to the fragment Y. Instead, object a/c/g would remain with fragment X. FIG. 8 illustrates metadata 400 after configuration fragment Y is configured using the set of commands 700 according to some embodiments.

The examples described above illustrate how configuration fragments of the configuration of network device 100 can be configured through CLI commands. As explained above, configuration fragments of the configuration of network device 100 may also be configured through OpenConfig commands. For instance, OpenConfig manager 110 can receive a set of OpenConfig commands for configuring a configuration fragment of network device 100. The set of OpenConfig commands may specify a configuration fragment to configure and a set of attribute values for a set of configuration objects. The set of attribute values for the set of configuration objects may be expressed in terms of a path expression and attribute value (referred to as an external path expression and attribute value). However, OpenConfig utilizes its own data model to represent the configuration of network device 100, which is different than the way the configuration of network device 100 is represented in network device 100 (e.g., configuration tree 200). Therefore, in response to receiving the set of OpenConfig commands, OpenConfig manager 110 translates the external path expression and attribute value specified in the set of Open-Config commands into a corresponding path expression and attribute value used by network device 100 to represent the configuration of network device 100 (referred to as an internal path expression and attribute value). Next, Open-Config manager 110 forwards the configuration fragment specified in the set of OpenConfig commands, the internal path expressions, and the corresponding internal attribute values to configuration manager 105 for processing. Configuration manager 105 processes the configuration fragment specified in the set of OpenConfig commands, the internal path expressions, and the corresponding internal attribute values in the same way as those examples described above by reference to FIGS. 1-8. When OpenConfig manager 110 receives a message indicating the success of the commands from configuration manager 105, OpenConfig manager 110 forwards the message to the source from which OpenConfig manager 110 received the set of OpenConfig commands.

FIG. 9 illustrates a process 900 for managing network device configurations based on configuration fragments according to some embodiments. In some embodiments, network device 100 performs process 900. Process 900 begins by receiving, at 910, a set of commands for configuring a configuration fragment of a network device. The configuration fragment defines a portion of a configuration of the network device. Referring to FIGS. 1 and 5 as an example, configuration manager 105 can receive set of commands 500 from a user through a CLI provided by configuration manager 105.

Next, process 900 determines, at 920, whether the set of commands are allowed to be applied to the configuration fragment of the network device. Referring to FIGS. 1, 2, and 5 as an example, configuration manager 105 translates the set of commands 500 into a set of instructions for modifying the configuration of network device 100 (i.e., an instruction to set the attribute value of the configuration object a/b/e/j (i.e., node 250) to 15, an instruction to set the attribute value of the configuration object a/c/g (i.e., node 235) to "hello," and an instruction to set the attribute value of the configuration object a/c/h (i.e., node 240) to "true."). Once configuration manager 105 finishes translating the set of commands 500 into the set of instructions, configuration manager 105 then determines whether the set of instructions can be applied to the configuration fragment X of the configuration of network device 100 (e.g., whether any conflicts exist between the configuration fragment X and configuration objects to be modified).

Finally, upon determining that the set of commands are allowed to be applied to the configuration fragment of the network device, process 900 configures, at 930, the portion of the configuration of the network device based on the set of commands. Referring to FIGS. 1 and 5 as an example, configuration manager 105 may determine that set of commands 500 are allowed to be applied to the configuration fragment X of network device 100 (e.g., no conflicts exist between the configuration fragment X and configuration objects to be modified). In response to that determination, configuration manager 105 configures the configuration of network device 100 based on the set of commands 500. If configuration manager 105 determines that set of commands 500 are not allowed to be applied to the configuration fragment X of network device 100 (e.g., a conflict exists between the configuration fragment X and configuration objects to be modified), configuration manager 105 rejects the set of commands by not making any changes to the configuration of network device 100.

Figure 10:
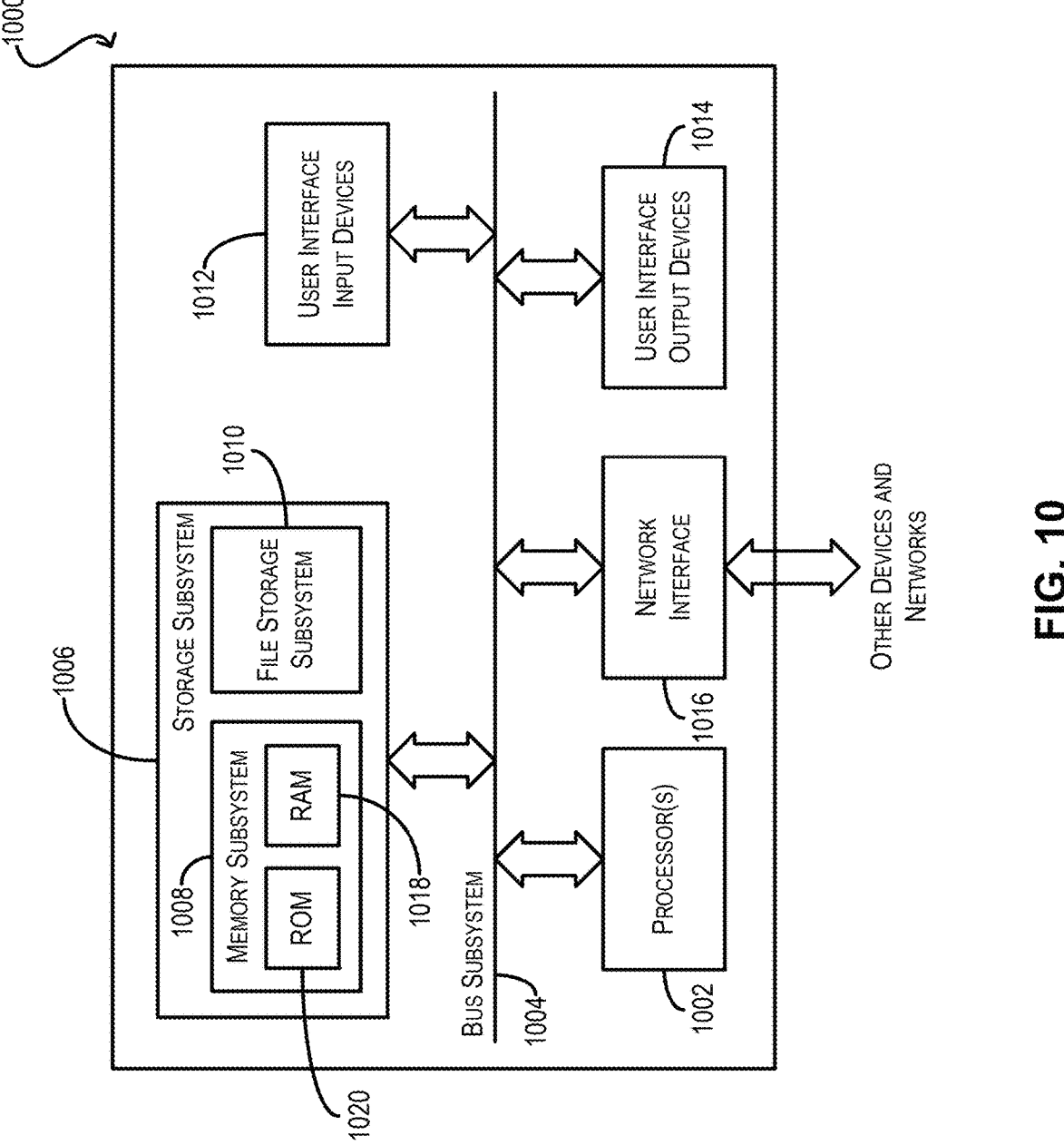
FIG. 10 illustrates an example computer system according to some embodiments.

FIG. 10 depicts an example computer system 1000 according to some embodiments. Computer system 1000 can be used to implement any of the computing devices, systems, servers, network elements, etc., described in the foregoing disclosure. For instance, computing system 1000 may be used to implement network device 100 depicted in FIG. 1. As shown in FIG. 10, computer system 1000 includes one or more processors 1002 that communicate with a number of peripheral devices via a bus subsystem 1004. These peripheral devices include a storage subsystem 1006 (comprising a memory subsystem 1008 and a file storage subsystem 1010), user interface input devices 1012, user interface output devices 1014, and a network interface subsystem 1016.

Bus subsystem 1004 can provide a mechanism for letting the various components and subsystems of computer system 1000 communicate with each other as intended. Although bus subsystem 1004 is shown schematically as a single bus, alternative embodiments of the bus subsystem can utilize multiple buses.

Network interface subsystem 1016 can serve as an interface for communicating data between computer system 1000 and other computer systems or networks. Embodiments of network interface subsystem 1016 can include, e.g., an Ethernet card, a Wi-Fi and/or cellular adapter, a modem (telephone, satellite, cable, ISDN, etc.), digital subscriber line (DSL) units, and/or the like.

User interface input devices 1012 can include a keyboard, pointing devices (e.g., mouse, trackball, touchpad, etc.), a touch-screen incorporated into a display, audio input devices (e.g., voice recognition systems, microphones, etc.) and other types of input devices. In general, use of the term "input device" is intended to include all possible types of devices and mechanisms for inputting information into computer system 1000.

User interface output devices 1014 can include a display subsystem, a printer, or non-visual displays such as audio output devices, etc. The display subsystem can be, e.g., a flat-panel device such as a liquid crystal display (LCD) or organic light-emitting diode (OLED) display. In general, use of the term "output device" is intended to include all possible types of devices and mechanisms for outputting information from computer system 1000.

Storage subsystem 1006 includes a memory subsystem 1008 and a file/disk storage subsystem 1010. Subsystems 1008 and 1010 represent non-transitory computer-readable storage media that can store program code and/or data that provide the functionality of embodiments of the present disclosure.

Memory subsystem 1008 includes a number of memories including a main random access memory (RAM) 1018 for storage of instructions and data during program execution and a read-only memory (ROM) 1020 in which fixed instructions are stored. File storage subsystem 1010 can provide persistent (i.e., non-volatile) storage for program and data files, and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computer system 1000 is illustrative and many other configurations having more or fewer components than system 1000 are possible.

Some embodiments may be implemented in a non-transitory computer-readable storage medium for use by or in connection with the instruction execution system, apparatus, system, or machine. The computer-readable storage medium contains instructions for controlling a computer system to perform a method described by some embodiments. The computer system may include one or more computing devices. The instructions, when executed by one or more computer processors, may be configured to perform that which is described in some embodiments.

Figure 11:
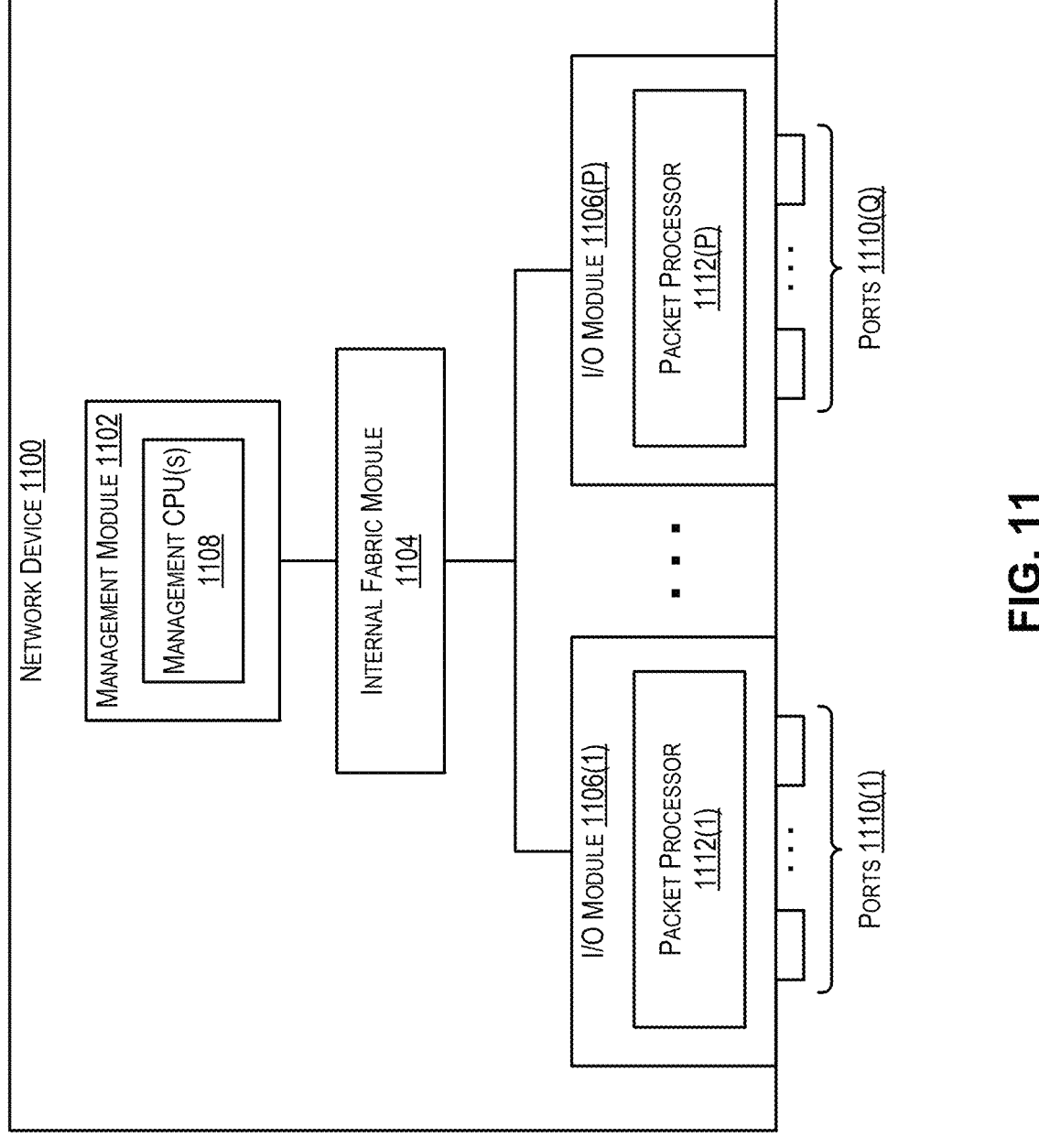
FIG. 11 illustrates an example network device according to some embodiments.

FIG. 11 illustrates the architecture of an example network device (e.g., a network switch or router) 1100 that may implement the techniques of the present disclosure according to certain embodiments. For example, network device 1100 may be used to implement network device 100 shown in FIG. 1.

Network device 1100 includes a management module 1102, an internal fabric module 1104, and a number of I/O modules 1106(1)-(P). Management module 1102 includes one or more management CPUs 1108 for managing/controlling the operation of the device. Each management CPU 1108 can be a general-purpose processor, such as an Intel/AMD x86 or ARM-based processor, that operates under the control of program code maintained in an associated volatile memory and/or stored in a non-transitory computer readable storage medium (not shown). In one set of embodiments, this program code can include code for implementing some or all of the techniques described in the foregoing sections.

Internal fabric module 1104 and I/O modules 1106(1)-(P) collectively represent the data, or forwarding, plane of network device 1100. Internal fabric module 1104 is configured to interconnect the various other modules of network device 1100. Each I/O module 1106 includes one or more input/output ports 1110(1)-(Q) that are used by network device 1100 to send and receive network packets. Each I/O module 1106 can also include a packet processor 1112, which is a hardware processing component that can make wire speed decisions on how to handle incoming or outgoing network packets.

It should be appreciated that network device 1100 is illustrative and other configurations having more or fewer components than network device 1100 are possible.

The following are some example embodiments of the present disclosure. In some embodiments, the techniques described herein relate to a method for configuring a network device based on configuration fragments, the method comprising receiving a set of commands for configuring a configuration fragment of a network device, wherein the configuration fragment defines a portion of a configuration of the network device; determining whether the set of commands are allowed to be applied to the configuration fragment of the network device; and, upon determining that the set of commands are allowed to be applied to the configuration fragment of the network device, configuring the portion of the configuration of the network device based on the set of commands.

In some embodiments, the techniques described herein relate to a method, wherein configuring the portion of the configuration of the network device based on the set of commands comprises generating a copy of a configuration tree that represents the configuration of the network device; based on the set of commands, modifying the copy of the configuration tree; and using the modified copy of the configuration tree to configure the portion of the configuration of the network device.

In some embodiments, the techniques described herein relate to a method, wherein the configuration tree comprises a set of leaf nodes, the method further comprising, based on a set of metadata describing the set of leaf nodes, determining whether a conflict exists between the configuration fragment and the copy of the configuration tree, wherein using the modified copy of the configuration tree to configure the portion of the configuration of the network device comprises, upon determining that the conflict does not exist between the configuration fragment and the copy of the configuration tree, using the modified copy of the configuration tree to configure the portion of the configuration of the network device.

In some embodiments, the techniques described herein relate to a method, wherein using the modified copy of the configuration tree to configure the portion of the configuration of the network device further comprises, upon determining that the conflict exists between the configuration fragment and the copy of the configuration tree, rejecting the set of commands.

In some embodiments, the techniques described herein relate to a method, wherein modifying the copy of the configuration tree based on the set of commands comprises deleting the portion of the configuration defined by the configuration fragment from the configuration tree.

In some embodiments, the techniques described herein relate to a method, wherein the set of commands specifies a configuration object in the configuration of the network device, the method further comprising comparing a first priority value associated with the configuration fragment and a second priority value associated with the configuration object; and based on the comparison, determining whether a conflict exists between the configuration fragment and the configuration object, wherein using the modified copy of the configuration tree to configure the portion of the configuration of the network device comprises, upon determining that the conflict does not exist between the configuration fragment and the configuration object, using the modified copy of the configuration tree to configure the portion of the configuration of the network device.

In some embodiments, the techniques described herein relate to a method, wherein using the modified copy of the configuration tree to configure the portion of the configuration of the network device further comprises, upon determining that the conflict exists between the configuration fragment and the configuration object, rejecting the set of commands.

In some embodiments, the techniques described herein relate to a method further comprising translating the set of commands into a set of instructions for modifying the configuration fragment of the network device.

In some embodiments, the techniques described herein relate to a non-transitory machine-readable medium storing a program executable by a network device. The program comprising a set of instructions for receiving a set of commands specifying a configuration fragment of a configuration of a network device to configure and a set of attribute values for a set of configuration objects in the configuration of the network device, wherein the configuration fragment defines a portion of the configuration of the network device; determining whether the set of commands are allowed to be applied to the configuration fragment of the network device; and, upon determining that the set of commands are allowed to be applied to the configuration fragment of the network device, configuring the portion of the configuration of the network device based on the set of commands.

In some embodiments, the techniques described herein relate to a non-transitory machine-readable medium, wherein configuring the portion of the configuration of the network device based on the set of commands comprises generating a copy of a configuration tree that represents the configuration of the network device, wherein the configuration tree comprises the set of configuration objects; based on the set of commands, modifying the copy of the configuration tree; and using the modified copy of the configuration tree to configure the portion of the configuration of the network device.

In some embodiments, the techniques described herein relate to a non-transitory machine-readable medium, wherein the program further comprises a set of instructions for, based on a set of metadata describing the set of configuration objects, determining whether a conflict exists between the configuration fragment and the copy of the configuration tree, wherein using the modified copy of the configuration tree to configure the portion of the configuration of the network device comprises, upon determining that the conflict does not exist between the configuration fragment and the copy of the configuration tree, using the modified copy of the configuration tree to configure the portion of the configuration of the network device.

In some embodiments, the techniques described herein relate to a non-transitory machine-readable medium, wherein using the modified copy of the configuration tree to configure the portion of the configuration of the network device further comprises, upon determining that the conflict exists between the configuration fragment and the copy of the configuration tree, rejecting the set of commands.

In some embodiments, the techniques described herein relate to a non-transitory machine-readable medium, wherein modifying the copy of the configuration tree based on the set of commands comprises deleting the portion of the configuration defined by the configuration fragment from the configuration tree.

In some embodiments, the techniques described herein relate to a non-transitory machine-readable medium, wherein the program further comprises sets of instructions for comparing a first priority value associated with the configuration fragment and a second priority value associated with a configuration object in the set of configuration objects; and based on the comparison, determining whether a conflict exists between the configuration fragment and the configuration object, wherein using the modified copy of the configuration tree to configure the portion of the configuration of the network device comprises, upon determining that the conflict does not exist between the configuration fragment and the configuration object, using the modified copy of the configuration tree to configure the portion of the configuration of the network device.

In some embodiments, the techniques described herein relate to a non-transitory machine-readable medium, wherein using the modified copy of the configuration tree to configure the portion of the configuration of the network device further comprises, upon determining that the conflict exists between the configuration fragment and the configuration object, rejecting the set of commands.

In some embodiments, the techniques described herein relate to a non-transitory machine-readable medium, wherein the program further comprises a set of instructions for translating the set of commands into a set of instructions for modifying the configuration fragment of the network device.

In some embodiments, the techniques described herein relate to a network device configurable based on configuration fragments, the network device comprising a set of processing units; and a non-transitory machine-readable medium storing instructions that when executed by at least one processing unit in the set of processing units cause the at least one processing unit to receive a first set of commands for configuring a first configuration fragment of a network device, wherein the first configuration fragment defines a first portion of a configuration of the network device; determine whether the first set of commands are allowed to be applied to the first configuration fragment of the network device; upon determining that the first set of commands are allowed to be applied to the first configuration fragment of the network device, configure the first portion of the configuration of the network device based on the first set of commands; receiving a second set of commands for configuring a second configuration fragment of the network device, wherein the second configuration fragment defines a second portion of the configuration of the network device; determining whether the second set of commands are allowed to be applied to the second configuration fragment of the network device; and, upon determining that the second set of commands are allowed to be applied to the second configuration fragment of the network device, configuring the second portion of the configuration of the network device based on the second set of commands.

In some embodiments, the techniques described herein relate to a network device, wherein the first portion of the configuration of the network device and the second portion of the configuration of the network device do not share any portion of the configuration of the network device.

In some embodiments, the techniques described herein relate to a network device, wherein the first set of commands are received through a command line interface provided by the network device.

In some embodiments, the techniques described herein relate to a network device, wherein the first set of commands comprises a set of OpenConfig commands.

The above description illustrates various embodiments of the present disclosure along with examples of how aspects of the present disclosure may be implemented. The above examples and embodiments should not be deemed to be the only embodiments, and are presented to illustrate the flexibility and advantages of various embodiments of the present disclosure as defined by the following claims. Based on the above disclosure and the following claims, other arrangements, embodiments, implementations, and equivalents will be evident to those skilled in the art and may be employed without departing from the spirit and scope of the present disclosure as defined by the claims.

What is claimed is:

1. A method for configuring a network device based on configuration fragments, the method comprising:
receiving a first configuration fragment comprising first configuration information pertaining to a configuration object in a configuration tree of the network device, the first configuration fragment being associated with a first priority value;
modifying the configuration object in the configuration tree in accordance with the first configuration information;
receiving a second configuration fragment comprising second configuration pertaining to the configuration object, the second configuration fragment being associated with a second priority value;
in response to receiving the second configuration fragment, determining whether the second priority value associated with the second configuration fragment is higher than the first priority value associated with the first configuration fragment; and
upon determining that the second priority value is higher than the first priority value, modifying the configuration object in the configuration tree in accordance with the second configuration information.

2. The method of claim 1, wherein modifying the configuration object in accordance with the first or second configuration information comprises:
generating a copy of the configuration tree;
based on the first or second configuration information, modifying the copy of the configuration tree; and
using the modified copy of the configuration tree to configure a portion of a configuration of the network device corresponding to the configuration object.

3. The method of claim 1, wherein the configuration object is a leaf node of the configuration tree.

4. The method of claim 1 further comprising, upon determining that the second priority value is less than the first priority value, refraining from modifying the configuration object in the configuration tree in accordance with the second configuration information.

5. The method of claim 2, wherein modifying the copy of the configuration tree based on the first or second configuration information comprises deleting the portion of the configuration corresponding to the configuration object from the configuration tree.

6. The method of claim 1 wherein the first or second configuration information is translated into a set of instructions for modifying the configuration object.

7. A non-transitory machine-readable medium storing a program executable by a network device, the program comprising sets of instructions for:
receiving a first configuration fragment comprising first configuration information pertaining to a configuration object in a configuration tree of the network device, the first configuration fragment being associated with a first priority value;
modifying the configuration object in the configuration tree in accordance with the first configuration information;
receiving a second configuration fragment comprising second configuration pertaining to the configuration object, the second configuration fragment being associated with a second priority value;
in response to receiving the second configuration fragment, determining whether the second priority value associated with the second configuration fragment is higher than the first priority value associated with the first configuration fragment; and
upon determining that the second priority value is higher than the first priority value, modifying the configuration object in the configuration tree in accordance with the second configuration information.

8. The non-transitory machine-readable medium of claim 7, wherein modifying the configuration object in accordance with the first or second configuration information comprises:
generating a copy of the configuration tree;
based on the first or second configuration information, modifying the copy of the configuration tree; and
using the modified copy of the configuration tree to configure a portion of a configuration of the network device corresponding to the configuration object.

9. The non-transitory machine-readable medium of claim 7, wherein the configuration object is a leaf node of the configuration tree.

10. The non-transitory machine-readable medium of claim 7, wherein the program further comprises sets of instructions for, upon determining that the second priority value is less than the first priority value, refraining from modifying the configuration object in the configuration tree in accordance with the second configuration information.

11. The non-transitory machine-readable medium of claim 8, wherein modifying the copy of the configuration tree based on the first or second configuration information comprises deleting the portion of the configuration corresponding to the configuration object from the configuration tree.

12. The non-transitory machine-readable medium of claim 7, wherein the first or second configuration information is translated into a set of instructions for modifying the configuration object.

13. A network device comprising:
a set of processors; and
a non-transitory machine-readable medium storing instructions that, when executed by at least one processor in the set of processors, cause the at least one processor to:
receive a first configuration fragment comprising first configuration information pertaining to a first configuration object in a configuration tree of the network device, the first configuration fragment being associated with a first priority value;
modify the configuration object in the configuration tree in accordance with the first configuration information;

receive a second configuration fragment comprising second configuration pertaining to the configuration object, the second configuration fragment being associated with a second priority value;

in response to receiving the second configuration fragment, determine whether the second priority value associated with the second configuration fragment is higher than the first priority value associated with the first configuration fragment; and upon determining that the second priority value is higher than the first priority value, modify the configuration object in the configuration tree in accordance with the second configuration information.

14. The network device of claim 13, wherein the first and second configuration fragments are received through a command line interface provided by the network device.

15. The network device of claim 13, wherein the first and second configuration fragments are received via a set of OpenConfig commands.

\* \* \* \* \*